April 21, 1964
W. H. LUSK
3,129,828
TOP LEVELER FOR GRAIN STORAGE BINS AND THE LIKE
Filed Jan. 14, 1963
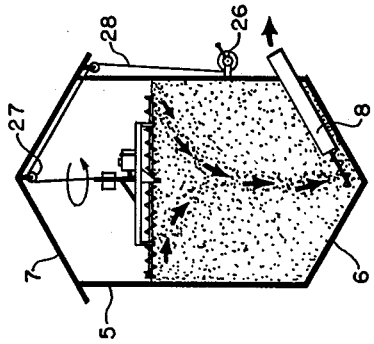
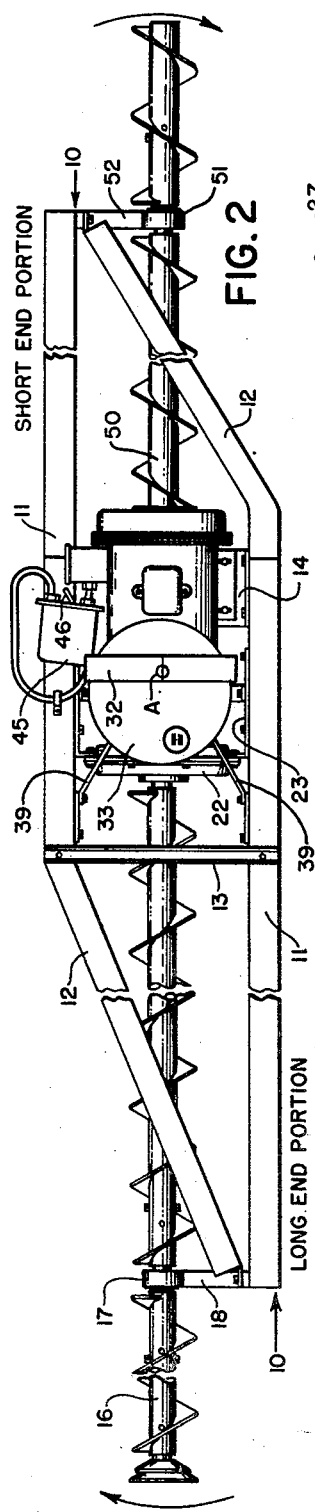
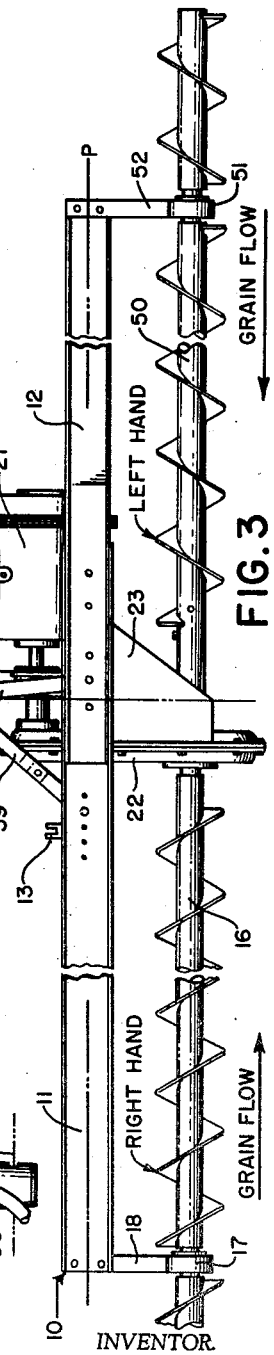
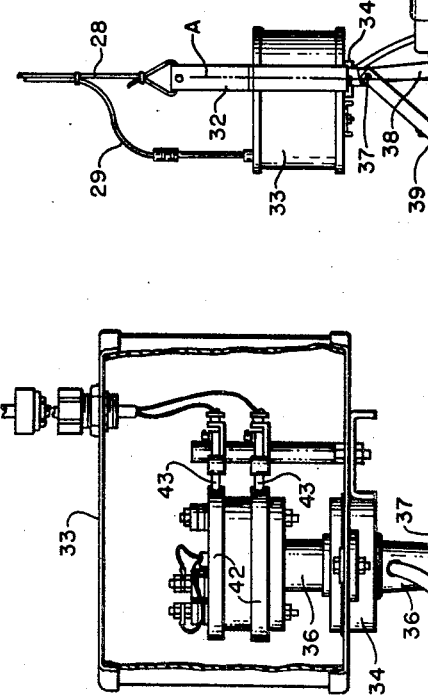
INVENTOR.
WILLIAM H. LUSK
BY Arthur H Robert
ATTORNEY

United States Patent Office 3,129,828
Patented Apr. 21, 1964

3,129,828
TOP LEVELER FOR GRAIN STORAGE BINS AND THE LIKE
William H. Lusk, Louisville, Ky., assignor to Clayton & Lambert Manufacturing Company, Buckner, Ky., a corporation of Delaware
Filed Jan. 14, 1963, Ser. No. 251,321
1 Claim. (Cl. 214—17)

This invention relates to top levelers for use in grain storage bins.

Cylindrical metal housings or bins, which are widely used today for storing grain such as stock feed corn, are normally provided with bottom or top unloaders for removing the grain as needed and often provided with top levelers for maintaining the top surface of the grain column in a level condition. Most top levelers employ a motorized auger which extends horizontally over the top of the grain from the vertical axis of the bin to the periphery thereof. The leveler is usually suspended from the top center of the roof of the bin in a manner permitting it to be vertically raised and lowered and horizontally rotated about the vertical axis of the bin.

When the leveler is lowered sufficiently to bring the motorized auger into engagement with the top of the grain column, the auger is rotated about its own horizontal axis in a direction such and at a speed such that it tends (a) to move grain along the auger either radially outward or radially inward and (b) to rotate the top leveler horizontally about the vertical axis of the bin. In some cases, multiple augers are employed and arranged so that they tend to rotate the top leveler horizontally about the vertical axis of the bin either in the same direction or in opposite directions.

The present invention is directed to improvements in top levelers of the multiple auger type and has for its principal object the provision of a top leveler with a novel multiple auger arrangement.

Another important object of the present invention is to provide a top leveler with a novel auger arrangement for rotating the leveler horizontally about the vertical axis of the bin.

Other objects are to provide a simply and inexpensively constructed leveler which is easy to make, install and operate, relatively free of troublesome maintenance and highly effective in keeping the top surface of the grain column in a level condition.

The more important objects of my invention are achieved by providing a top leveler of the multiple auger type with one auger which tends to rotate the leveler horizontally in one direction at one speed and with a second auger which tends to rotate the leveler horizontally in the opposite direction at a different speed. With two such augers, the differences between their respective abilities to rotate the leveler horizontally determine the direction of horizontal rotation and its rate of speed.

The invention is illustrated in the accompanying drawing wherein:

FIG. 1 is a somewhat schematic view of a bottom unloading grain bin provided with a top leveler made in accordance with the present invention;

FIG. 2 is a top plan view of one embodiment of the present invention;

FIG. 3 is a side elevational view of the embodiment shown in FIG. 2; and

FIG. 4 is a broken side elevational view of the swivel for rotationally suspending the top leveler.

While the present invention may be used with bins of various heights and diameters and with any conventional top or bottom unloading grain bin structure, it is illustrated in FIG. 1 in connection with a bin of any desired height but of 19′ in diameter (or 124″ radius) and with a bottom unloading structure of the type comprising: a cylindrical grain bin 5 having a hopper bottom 6, a conical roof 7 and a diameter of 19 feet; and a bottom unloader 8, which inclines from the bottom center of the bin upwardly along one slanted wall of its hopper bottom and projects outwardly through the lower end portion of the side wall of the bin. In use, the bottom unloader is operated to remove grain from the bottom center of the bin as needed. Normally, this removal causes grain to flow downwardly along the vertical axis of the bin as indicated by the solid black arrows.

Without a top leveler, this vertically centered flow will result in the removal of the vertically centered grain first. As a consequence, the column of grain in the bin will ultimately be formed with a funnel-shaped opening having a wide mouth at the top of the grain column and a narrow bottom at the inlet to the unloader. These "funnels" are objectionable. They may leave grain standing along the walls of the bin out of reach of the bottom auger. As a result of the upward migration of moisture, "funnels" promote the formation of solid ice in the grain during freezing weather and of a white yeast crust over the top surface of the grain. Solid ice is formed in chunks along the mouth of the funnel. White yeast crust formations do not hurt the quality of the feed but they can result in hard chunks that clog the bottom unloader. Top levelers prevent the formation of funnels, substantially reduce the formation of yeast crusts and ice chunks and assure fast, smooth grain delivery.

The top leveler illustrated in the drawing conventionally includes: a horizontally elongate frame; a horizontally-arranged auger mounted on the frame to extend from a point adjacent the vertical axis of the bin radially to the periphery of the bin; a frame-mounted motorized drive for the auger; and winch means for raising and lowering the leveler to and supporting it at any available elevation within the bin.

The frame 10, as a whole, has a suspension axis, which is indicated at "A" in FIGS. 2–3 and which can be shifted laterally within practical limits. The frame is offset lengthwise relative to axis "A" so as to have long and short end portions, that is to say, a long portion of its length extends on one side of axis "A" while a shorter portion of its length extends on the opposite side thereof. Viewed in top plan, the frame 10 is in the shape of a parallelogram comprising: one pair of spaced parallel channel-shaped side members 11; and another pair of spaced parallel channel-shaped end members 12, which are slanted relative to the side members 11 and rigidly connected to such side members. The parallel end members 12 are slanted rearwardly outward, relative to the forward direction of leveler rotation; hence, each outermost end portion of the frame tapers toward the lag side of the frame 10. Oppositely disposed frame members 11 are rigidly connected together on the long end portion of frame 10 by a relatively light upwardly open channel member 13 extending transversely from the top face of the mid-section of one side channel member 11 to the top face of the intersection of the other side member 11 with the corresponding end member 12. On the short end portion of frame 10, opposite side members are rigidly connected together by a wide, upwardly-open vertically-shallow U-shaped strap bracket 14, having its bight adjacent the elevational level of the bottom face of the side channel members 11.

The main auger 16 is located on that side of axis "A" which corresponds to the long end portion of frame 10. It conventionally extends parallel to and is spaced a suitable distance below the major horizontal plane P of the frame 10. This main auger 16 is assumed to be a right hand auger. For a bin of 124″ radius, a 103.5 inch long auger 16 may be provided in two sections comprising: an inner section 85.5" long; and an outer section approximating 18" in length. It projects from a point in the vicinity of the frame's vertical axis A horizontally to a point spaced 6 to 15" from the periphery of the bin. The outer end portion of the auger 16 is rotationally carried by the frame by means of a bearing block 17 which is secured to the lower end of a suitable strap hanger 18, the upper end of which is secured to the outer corner of the tapered end of the long end portion of the frame. The inner end of the auger 16 is rotationally supported by the frame through a reduction gear mechanism which forms a part of the motorized drive.

The motorized drive conventionally includes: an electric motor approximating 1.0 horsepower; and a reduction gear mechanism interposed between the motor and auger and connected to both. The electric motor 21 is located near the inner end of the short portion of the frame and mounted on the bight of the wide shallow U-shaped strap bracket 14. The reduction gear mechanism comprises a housing 22 having upper and lower portions, which house the high and low speed gearing of the gear mechanism. It is interposed between the motor 21 and auger 16 with its high speed gearing aligned with and connected to the drive shaft of the motor 21 and with its low speed gearing aligned with and connected to the inner end of the auger 16. The reduction gear mechanism is supported on the frame by means of a pair of plate brackets 23, one on each side channel frame member 11.

The winch means, shown in FIG. 1, conventionally includes: an outside winch 26 mounted on the grain bin structure; an inside pulley 27 located along the long axis of the grain bin adjacent the roof structure from which it is supported; a hoist cable 28 extending on the outside of the bin from the winch to the roof and thence entering the bin to extend around the pulley 27 and pass downwardly to the leveler; and a suspension means mounting the top leveler upon the inner end of the hoist cable 28 for rotation relative thereto (about the vertical axis provided by the suspension means) so as to permit the leveler to rotate without twisting the hoist cable 28 and the incoming electrical power cable 29.

Mechanically, the suspension means includes: a stationary assembly of parts 32–34; and a relatively rotatable assembly of parts 36–39. The stationary assembly of the swivel comprises: strap hanger means 32 connected to depend from the lower inner end of the hoist cable 28; a hollow box 33 non-rotatably supported on the lower end portion of the strap hanger 32; and a bearing 34 fixedly carried on the bottom wall of the box 33. The rotatable assembly of the swivel comprises: a hollow vertical pipe 36 rotationally carried by the bearing 34 with its upper end in the box and its lower end depending away from the bottom wall of the box and having a horizontal pivotal axis at 37; a strap metal hanger 38 hinged at its upper end to the pipe 36 to depend from the pivotal axis 37 of the pipe and pivotally connected at its lower end to the frame 10 so as to suspend the frame from a suspension point corresponding to the pivotal axis 37; and means for laterally adjusting the position of the suspension point relative to and in the direction of the length of the frame, said adjusting means comprising a strap member 39 interconnecting pipe 36 and hanger 38 at pivotal axis 37 with frame 10 at any of a range of points spaced along the length of the long end portion of the frame. Stated otherwise, the suspension means includes (a) a swivel presenting a vertical axis and having a stationary part and a rotary part mounted on the stationary part for rotation about said axis; and (b) means interconnecting the rotary part with the frame to suspend the frame for rotation therewith.

For electrical purposes, the box 33 houses a collector ring assembly composed of one set of electrical collector ring terminals 42 and a cooperating set of relatively rotatable electrical brush terminals 43. One or the other of these sets of terminals (e.g. the brush terminals 43), is mounted on the box 33 of the stationary assembly and electrically connected to the incoming electrical power cable 29 which follows the path of the hoist cable 28. The remaining set of terminals (e.g. the ring terminals 42) is mounted on the upper end of the pipe 36 of the rotatable assembly and electrically connected to the motor 21 preferably through a motor reversing switch 45, which may be operated manually by handle 46 or electrically through the power cable 29 in any suitable manner by any suitable means. The electrical circuits for operating and reversing the motor 21, are not shown because they are conventional and well known.

In the arrangement thus far described, when the auger 16 is placed in contact with the grain and rotated in the direction required to move that grain inwardly toward the vertical axis of the bin, it will also tend to rotate the top leveler horizontally (as a unit) in one direction about the vertical axis of the bin which should roughly coincide with the vertical axis A of the frame 10. We shall designate this direction of rotation as the "forward" direction in order to distinguish this operation from the operation which occurs when the direction of auger rotation and feed is reversed. In FIG. 2, this forward direction of rotation is clockwise as indicated by the arrows at opposite ends of FIG. 2.

The speed, at which the leveler rotates about the vertical axis of the bin, varies between a maximum speed with minimum load or depth of grain contact and a minimum speed with maximum load or depth of grain contact. However, for the sake of clarity, we shall assume average load and speed conditions (unless otherwise indicated) with the understanding that heavier loads reduce the speed and lighter loads permit it to increase.

In accordance with my invention, the top leveler is provided with a counter auger 50 which, when rotated to feed grain inwardly toward the vertical axis of the bin, tends to rotate the top leveler horizontally in the opposite or backward direction at a different speed. As a consequence, the difference between the rotative forces, which the stronger and weaker of these two augers respectively exert, will determine the actual speed of rotation in the direction dictated by the stronger auger.

The counter auger 50 is located on that side of the swivel or suspension axis A which corresponds to the short end portion of frame 10. It extends parallel to and is spaced below the major horizontal plane P of the frame 10. Since the main auger is a right hand auger, the counter auger is a left hand auger. For a bin of 124" radius, a 74" long counter auger 50 may be provided in two sections comprising: an inner section 62" long; and an outer section approximating 12" in length. It projects from a point in the vicinity of the vertical swivel axis A horizontally to a point spaced 50" more or less from the periphery of the bin.

The outer end portion of the counter auger 50 is rotationally carried by the frame 10 by means of a bearing block 51 which is secured to the lower end of a suitable strap hanger 52, the upper end of which is secured to the outer corner of the tapered end of the short end portion of the frame. The inner end of the counter auger 50 is aligned with and connected to the corresponding end of the low speed gearing and thus rotationally supported by the frame 10 through the housing 22 of the reduction gear mechanism.

Each of the augers 16 and 50 is assumed to have the same diameter and the same pitch. For example, the diameter of each may be 5" and the pitch of each 5".

When the leveler is installed in a grain bin, the location of its suspension point, i.e., pivotal axis 37, should be horizontally adjusted to make the long end portion slightly heavier than the short end portion. For example, when the leveler is suspended in the air, its long end portion should dip some 2 to 3 feet below its level position. This can be accomplished by suitably shifting the points at which the lower ends of strap hangers 39 are connected to the frame members 11.

In operation, we assume the use of the following: a 19' bin; a 103" right hand auger 16 and a 74" counter auger 50, each having a diameter of 5" and a pitch of 5"; and a 1 horsepower drive motor 21 operating to drive both augers at the same speed of auger rotation. In one embodiment of this character, when the top leveler was lowered into contact with the top surface of the bin and operated under average load conditions, the right hand auger 16, operating alone, tended to rotate the leveler at a forward speed approximating 4¼ r.p.m. or 255 revolutions per hour. When the counter auger 50 was placed in operation, the forward rotational speed of the top leveler dropped from 255 revolutions per hour to a value in the range of 15 to 25 revolutions per hour. In other words, the main right hand auger 16 tended to rotate the top leveler at a forward rotational speed approximating 255 revolutions per hour while the counter auger tended to rotate the top leveler at a backward rotational speed approximating 230 to 240 revolutions per hour with the result that the net leveler speed was in the range of 15 to 25 revolutions per hour in the forward direction.

Of course, it will be understood that, as the top leveler rotates, both screws feed grain inwardly toward the center of the bin. The rate of this inward feed should be so co-ordinated with the rate of removal as to maintain the top suface of the grain column in the bin in a level condition and thus prevent the formation of a funnel shaped opening.

If a variation in this rate of inward feed is desired, it may be variously accomplished. For example, the speed of both augers may be raised or lowered or the short auger 50 may be increased or decreased in length, diameter or pitch or the drive may be modified to increase or decrease the speed of one auger relative to the other. While, for reasons for economy, I prefer right and left hand augers of the same diameter and pitch, the augers need not be the same in these respects. As a matter of fact, I have successfully used counter augers having a diameter substantially larger than the diameter of the main auger. It will, therefore, be understood that my invention is not limited to a 19' bin diameter or to augers of the speeds, lengths, diameters and pitches specified or to motors of the horsepower indicated. These date have been given simply to facilitate a clearer understanding of the invention.

The motor 21 preferably is made reversible to enable the leveler to be operated for outward feeding purposes on those occasions where an outward feed is desired. An outward feed is desired where a grain bin is being filled because here the grain will normally be filled through the top of the housing and it will normally tend to form a mound. With an outward feed, the incoming grain can be leveled as it is fed into the bin by operating the leveler in reverse and raising it as the level within the bin increases.

Levelers embodying the present invention may be usefully employed in connection with materials other than grain and with bins other than feed storage bins. For example, they may be used on all stock feed materials including silage and in various kinds of material handling and storage structures including grain drying bins where a level top surface is highly desirable in order to promote uniform drying.

It will be appreciated that my top leveler, which is adapted to be lowered into contact with the top surface of a column of material in a grain storage bin, silo or like structure, comprises: (A) a horizontally elongate frame; (B) means for rotationally suspending the frame in a horizontally balanced condition of desired horizontal level, (1) the suspension means including (a) a swivel having a vertical axis, a stationary part adapted to be suspended from the enclosing structure and a relatively rotatable part mounted on the stationary part for rotation about said axis and (b) means interconnecting the rotatable part with the frame to suspend the frame therefrom for rotation therewith about said axis and (C) means for rotating the frame, the rotary swivel part and the interconnecting means as a unit horizontally about the said vertical swivel axis when the leveler is lowered into contact with the top surface of a column of material, (1) this means including a pair of differential torque augers horizontally mounted on the frame to extend outwardly from the vicinity of said axis, (a) one auger being operative, when rotated to feed said material along its length in one radial inward or outward direction relative to said axis, to tend to rotate the top leveler horizontally forward at one speed and (b) the other auger being operative, when rotated to feed said material along its length in the same radial direction relative to said axis, to tend to rotate the top leveler horizontally backward at a different speed. I use the term "differential torque augers" because the augers may rotate at the same speed as indicated or at different speeds. Where they are rotated at the same speed, they must differ in some dimension such as length. However, when they rotate at the different speeds, they may be of the same length, diameter and pitch.

Having described my invention, I claim:

A top leveler of the type adapted to be lowered into contact with the top surface of a column of material in a grain storage bin, silo or like structure, comprising:
 (A) a horizontally elongate frame;
 (B) means for rotationally suspending the frame in a horizontally balanced condition of desired horizontal level;
  (1) said suspension means including
   (a) a swivel having a vertical axis, a stationary part adapted to be suspended from said structure and a relatively rotatable part mounted on said stationary part for rotation about said axis, and
   (b) means interconnecting the rotatable part with the frame to suspend the frame therefrom for rotation therewith about said axis; and
 (C) means for rotating said frame, rotary swivel part and interconnecting means as a unit horizontally about said vertical swivel axis when the leveler is lowered into contact with the top surface of a column of material,
  (1) said means including a pair of differential torque augers horizontally mounted on the frame to extend outwardly from the vicinity of said axis,
   (a) one auger being operative, when rotated to feed said material along its length in one radial direction relative to said axis, to tend to rotate the top leveler horizontally forward at one speed and
   (b) the other auger being operative, when rotated to feed said material along its length in the same radial direction relative to said axis, to tend to rotate the top leveler horizontally backward at a different speed.

References Cited in the file of this patent

UNITED STATES PATENTS

| | | |
|---|---|---|
| 2,500,043 | Radtke | Mar. 7, 1950 |
| 2,663,594 | Dennick | Dec. 22, 1953 |